United States Patent [19]
Dong

[11] Patent Number: 5,517,098
[45] Date of Patent: May 14, 1996

[54] AUTOMATIC TRACKING MOBILE PLATFORM

[76] Inventor: Dawei Dong, 401 Aldo Ave., Santa Clara, Calif. 95054

[21] Appl. No.: 240,116

[22] Filed: May 9, 1994

[51] Int. Cl.⁶ .............................. G05D 1/02; G08C 17/00
[52] U.S. Cl. ............................ 318/581; 318/587; 318/16; 280/DIG. 5
[58] Field of Search ..................................... 318/580, 581, 318/587, 16, 139, 430, 431; 180/6.48, 6.5, 79.1; 280/DIG. 4, DIG. 5, DIG. 6

[56] References Cited

U.S. PATENT DOCUMENTS

| | | |
|---|---|---|
| 3,742,507 | 6/1973 | Pirre . |
| 3,748,564 | 7/1973 | Ohba . |
| 3,812,929 | 5/1974 | Farque . |
| 4,844,493 | 7/1989 | Kramer . |
| 5,167,389 | 12/1992 | Reimers . |
| 5,350,982 | 9/1994 | Seib . |

*Primary Examiner*—Bentsu Ro
*Attorney, Agent, or Firm*—Keith Kline

[57] ABSTRACT

An automatic tracking mobile platform that works logically and practically. The process of making it is simple and cost efficient. An emitter is carried by the user; this emitter transmits various electromagnetic signals including infrared, visible light, laser, or ultraviolet. The platform has electromagnetic sensors connected to its front wheel which synchronously turn with it, and these three sensors are separated by panels. The panels block one sensor from the others so that only one sensor can respond to the transmitter at any one time to turn the platform left or right. An electrical motor and a mechanical steering wheel are connected to the front wheel, which drives the mobile platform. The receiver is set to screen electromagnetic signals from the transmitter so the platform can turn to the left, turn to the right, start, or stop to accomplish its automatic tracking purpose.

To reduce interference from the reflection of direct sunlight on the platform sensors, horizontal grade gratings are placed in front of the sensors. The receiver sensors can receive signals directly from transmitter. Other inventions do not include provisions to increase the sensitivity of the sensors in the presence of reflections of direct sunlight. Moreover, in order to avoid reflection interference, especially indoors, laser light can be used to help the platform track the user successfully.

8 Claims, 8 Drawing Sheets

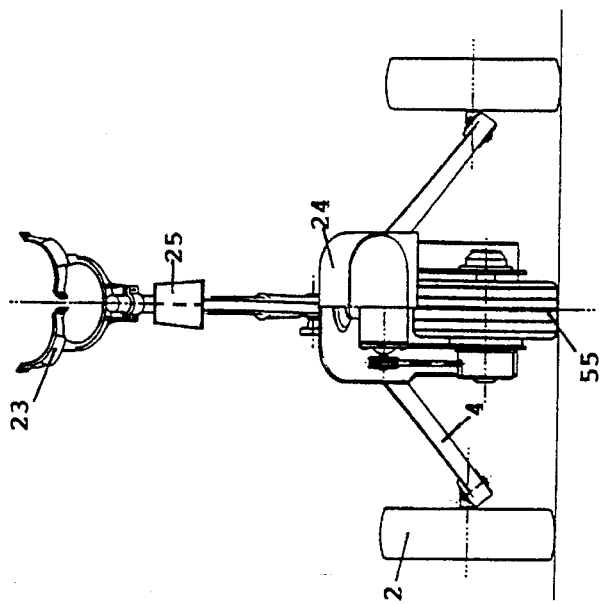
FIG 1B
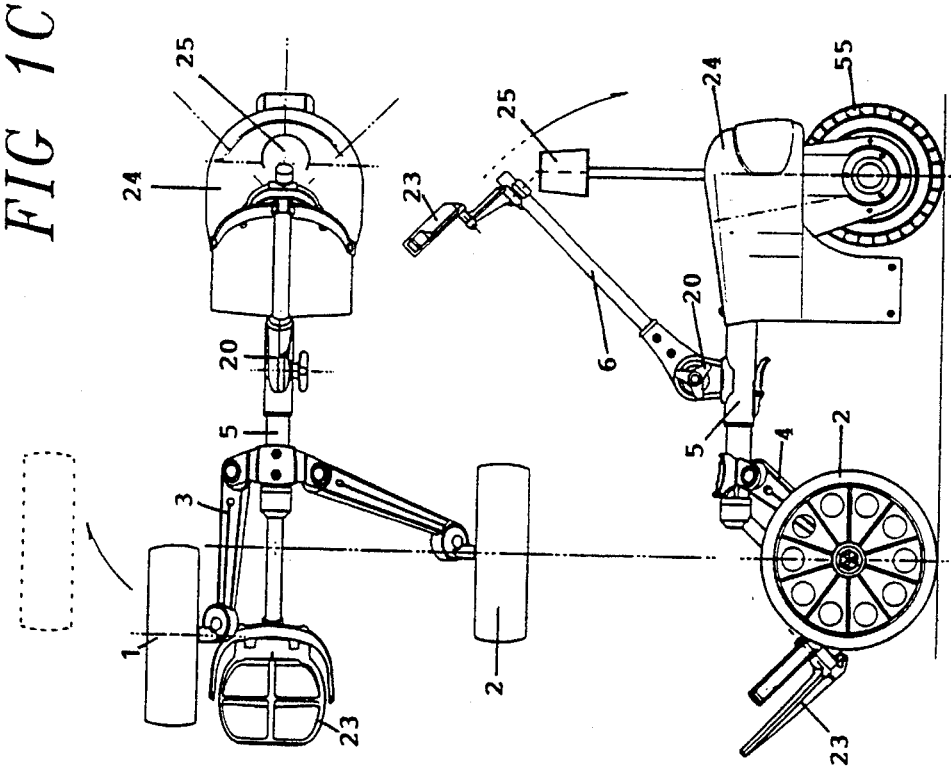
FIG 1C
FIG 1A

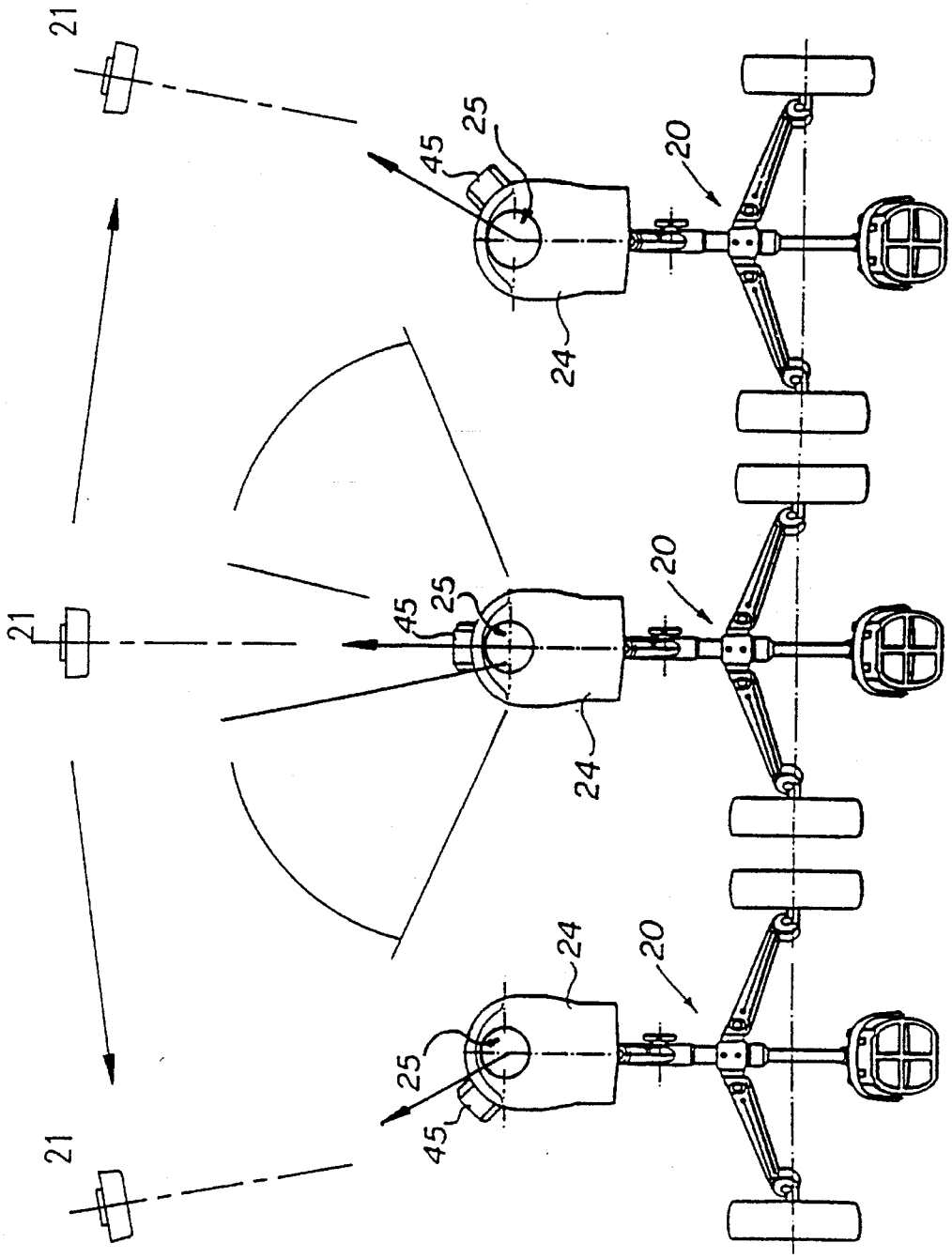

AUTOMATIC TRACKING MOBILE PLATFORM

The present invention relates generally to a remotely controlled mobile platform, and more particularly to a mobile platform which automatically tracks a person wearing an emitter.

BACKGROUND OF THE INVENTION

It is often the case than an individual desires to walk about, bringing along a bulky and/or heavy objects, without carrying the item. Some individuals cannot carry heavy items and, on longer journeys, this frustrates and tires most people. For instance, wheelbarrows are often heavily loaded and difficult to manuever. Similarly, luggage is frequently weighty and obtrusive. Likewise, a golf bag is a heavy item to carry during a long round of golf.

Many individuals enjoy playing the sport of golf. Walking during the game is fun and provides exercise. Unfortunately, many people cannot walk a golf course because they are not comfortable carrying clubs. Further, maneuvering a mobile platform, such as a golf cart, often breaks a golfer's concentration, adversely affecting his or her game.

Riding in a golf cart does not provide the exercise which many golfers desire. Pull-carts cause discomfort and fatigue to many players.

In recent years, some motorized pull-carts have been developed to allow a user to walk a course. While limiting physical exertion needed to guide or pull the cart, these motorized carts still require the user to manually start, stop and control the cart. This means the user must constantly keep a hand on the cart while it is moving. Therefore, the user cannot fully concentrate on golf because he or she must control the cart.

Additionally, it is extremely difficult to maneuver a cart through some areas of a course. A golfer may be able to walk into such an area but the cart cannot follow. Therefore, the golfer must chose a club, walk to his ball and hit, return to the mobile platform, and then circumvent the area through which the mobile platform cannot proceed.

Recently, remote control golf carts have been developed, but they still require a user to constantly control the cart, this is distracting as well as potentially dangerous.

Further, manually operated motorized carts slow down as they move up hills and speed up going down hills, This change of speed is uncomfortable for the golfer.

Accordingly, it can be seen that a need yet remains for a mobile platform which automatically tracks the user at a relatively constant speed, and which has a manual remote control override for moving through particularly rough terrain. It is to the provision of such a mobile platform that the present invention is directed.

SUMMARY OF THE INVENTION

Briefly described, in a preferred form the present invention comprises a mobile platform which automatically follows the user, requiring no user input. The automatic tracking mobile platform has three wheels, a platform for supporting the items(s) to be carried, a motor and controls for said motor, a steering means and controls for said steering, a transmitter, and a receiver. The transmitter is carried by the individual, and the mobile platform tracks the transmitter. The receiver is affixed to the mobile platform.

The invention may be used in many ways: wheelbarrows, luggage carriers, golf bag carriers, or any other function where an individual needs to transport an item which is difficult to carry. The automatically tracking golf bag carrier is primarily focused upon herein as one embodiment of the present invention. This, however, is not intended to preclude or limit other uses of the automatic tracking mobile platform.

Preferably, the mobile platform is turned on at the beginning of a round of golf and simply tracks the user throughout the play. The mobile platform tracks within a range of up to about 30 feet and will automatically stop about 3–4 feet behind the user when the user stops. The mobile platform travels at a constant speed whether going uphill, downhill, or on a flat surface. Also, the mobile platform provides the user with optional manual remote control to override the automatic tracking mode.

Accordingly, it is a primary object of the present invention to provide a mobile platform which automatically tracks a person carrying a transmitter.

It is another object of the present invention to provide a mobile platform that moves at a constant rate of speed regardless of the incline over which the mobile platform travels.

It is another object of the present invention to provide a mobile platform which automatically stops at a pre-determined distance behind an individual carrying a transmitter when that persons stands still.

It is another object of the present invention to provide an automatically tracking mobile platform which may be remotely controlled.

It is another object of the present invention to provide an automatically tracking mobile platform which has multi-channel electronic control to prevent interference from other electronic emitters, including other automatic tracking mobile platforms.

Other objects, features and advantages of the present invention will become apparent upon reading the following specification in conjunction with the accompanying drawings.

BRIEF DESCRIPTION OF THE DRAWINGS

FIG. 1a is a side view of a preferred embodiment of the automatic tracking mobile platform;

FIG. 1b is a frontal view of the automatic tracking mobile platform of FIG. 1a;

FIG. 1c is a top view of the automatic tracking mobile platform of FIG. 1a;

FIG. 2 is a block diagram of the transmitter platform, transmission pattern, receiver platform, and motor control for the automatic tracking mobile platform of FIG. 1a;

FIG. 3 is a circuit diagram of the emitter and control circuitry for the automatic tracking mobile platform of FIG. 1a;

FIG. 4 is a circuit diagram of the left and right sensors and steering control for the automatic tracking mobile platform of FIG. 1a;

FIG. 5 is a circuit diagram of a receiver module, and four such modules control starting, left and right turn, and stopping of said mobile platform for the automatic tracking mobile platform of FIG. 1a;

FIG. 7 is a side view of the steering control with a cut away view of the drive platform for the automatic tracking mobile platform of FIG. 1a;

DETAILED DESCRIPTION

Figure 2:
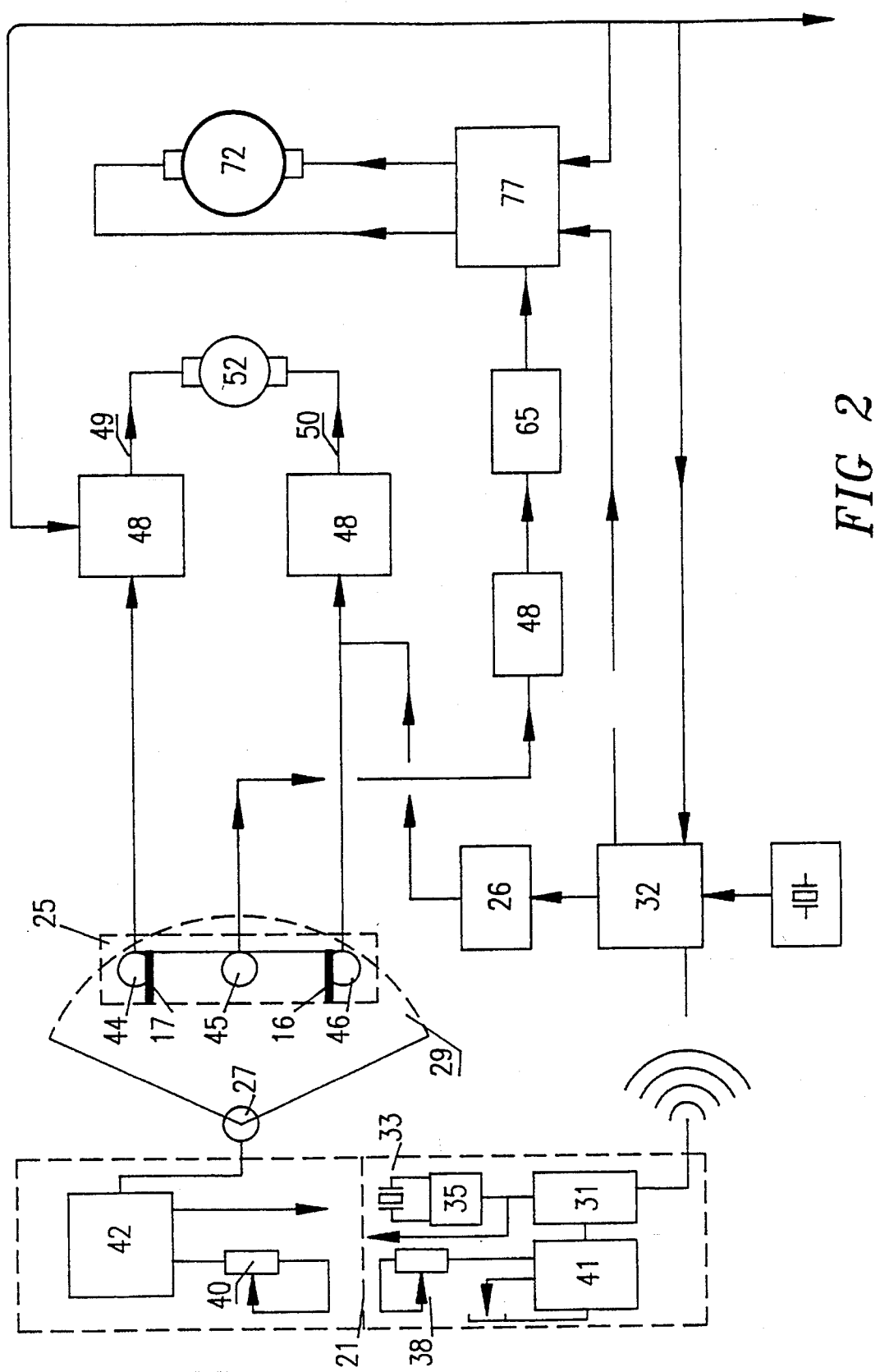

Referring now to the drawings, wherein like reference numerals represent like parts throughout the various views, FIGS. 1a, 1b, and 1c show the automatic tracking mobile platform 20, according to a preferred form of the invention. The automatic tracking mobile platform 20 includes a transmitter assembly 21 (FIG. 2), a receiver platform 25, both steering and forward motion motors 52, 72 and steering and forward motion control circuits 48, 66, 77.

The mobile platform 20 has two rear wheels 1, 2 and a front steering and driving wheel 55 in the preferred embodiment. The two rear wheels 1, 2 are attached to members 3, 4 which are pivotally connected to the main support member 5. The upper arm 6 of the golf bag support apparatus 23 is pivotally connected to the main frame member 5. The receiver housing 24 is connected adjacent to the main support member 5 in the preferred embodiment.

FIG. 2 shows a general function diagram of the emitter 27, sensor units 44, 45, 46 and motor controls. The emitter 27, sends electromagnetic signal to the sensors 44, 45, and 46 on the mobile platform 20, where the signal is processed. The outputs of left 46 and right 44 sensors are used to determine if any sensor is receiving a tone-modulated electromagnetic signal, the emitter 27 is to the left or right of the mobile platform. Therefore, as described in more detail below, outputs from the sensor units 44, and 46 are input to the steering motor 52 and the mobile platform 20 is directed toward the emitter 27, thus following the user.

The center sensor's 45 output is input to a control circuit 65 and then to a speed governor 77. The control circuit 65 turns the motor off when the electromagnetic input to the sensor 45 is below a certain intensity, which indicates the emitter 27 is beyond tracking range (about 30 feet). This prevents the mobile platform 20 form moving about undirected. When the light intensity is above a certain value the motor is again stopped because the mobile platform 20 must be within about 3-4 feet of the emitter 27. If the intensity indicates the emitter 27 is between about 3-4 feet and about 30 feet, the drive motor 72 is on and moves the mobile platform 20.

The speed governor 77 is designed to make sure the mobile platform 20 moves at a relatively constant speed. The power input to the drive motor 72 is increased when the mobile platform 20 travels uphill and power input is decreased when the mobile platform 20 travels downhill.

1. TRANSMITTER

Figure 3:
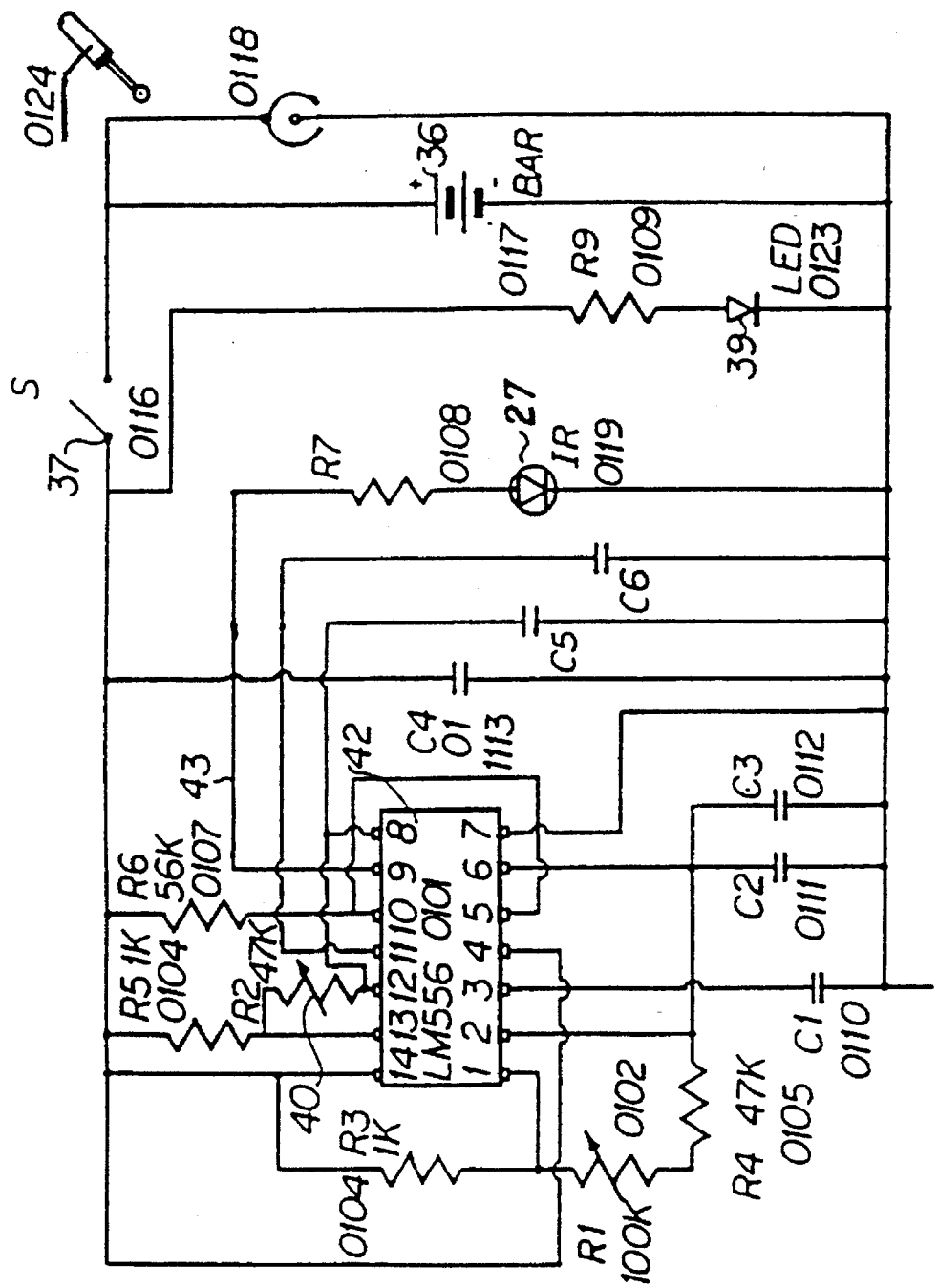
Figure 4:
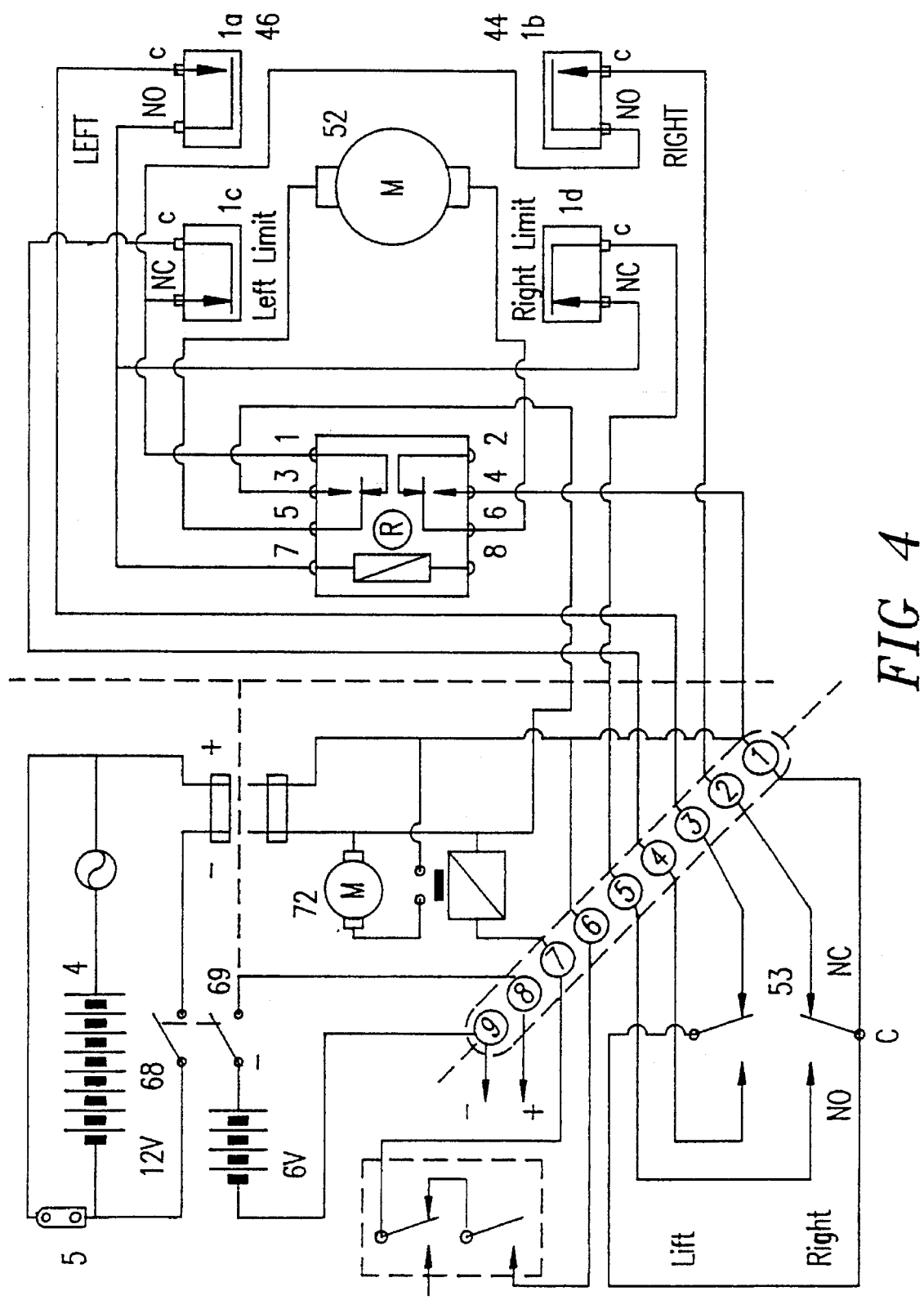

In the preferred embodiment of the transmitter assembly 21, as shown in FIG. 3, the assembly 24 contains electromagnetic emitter 27. Emitter 27 sends a tone-modulated electromagnetic signal 29, which is used to control the mobile platform's 20 direction and walk of travel.

Emitter 27 is powered by a 9v battery 36, and turned on and off by a switch 37. When the switch 37 turned on, emitter 27 transmits, and a light emitting diode (LED) 39 turns on to inform the user that the emitter 27 is on. The transmitter circuit uses two timers (both are 556 Dual Timers) to drive an electromagnetic LED 27 and transmit the electromagnetic signal.

Also, a radio frequency remote control transmitter 31 is in the transmitter assembly 21 as shown in FIG. 2. The well-known RF remote control can also operate this platform when not using the automatic tracking platform electromagnetic transmitter.

2. RECEIVER

In the preferred embodiment, three electromagnetic sensors 44, 45 and 46 are located on the mobile platform's receiving unit 25. Two sensors 44, and 46 use the tone-modulated electromagnetic signal form the emitter 27 to control steering, and the center sensors 45 uses the electromagnetic signal from the emitter 27 to control starting and stopping movement of the mobile platform 29.

Also provided is a RF receiver 32 and servo 26 for controlling the steering motor 52 when automatic tracking is being overridden, as is shown in FIG. 2. These devices are commonly available from an electronics store. The user selects RF remote control and overrides automatic tracking by simply turning on the RF transmitter 31. The user then directly controls the motion of the mobile platform 20.

A. ELECTRONIC STEERING CONTROL

FIG. 10 illustrates reception in sensors 44 and 46 for various emitter locations. If the mobile assembly 20 is facing the emitter 27, neither sensor 44 or 46 receives tone-modulated electromagnetic signal because panels 16 and 17 block the light. Therefore, if the front wheel 55 is turned left and the emitter 27 is to the left of the mobile assembly, as shown in the left hand drawing on FIG. 10, sensors 44 and 46 receive no tone-modulated electromagnetic signal and the mobile assembly moves forward toward emitter 27. The same process occurs for different sensor/emitter relationships. For instance, if electromagnetic is received in the left hand sensor 46, the transmitter platform 24 is located to the left of the forward facing mobile platform 20. Because the mobile platform 20 is designed to directly track the transmitter platform 24, the receiver platform 25 and steering wheel 55 will turn left to follow the emitter 27, thus turning the mobile platform 20 left. Steering wheel 55 will continue turning until no electromagnetic signal is received in either sensors 44 or 46 indicating that the mobile assembly is headed straight toward emitter 27.

The amplifier output 49, and 50 control the steering motor 52. Therefore, when the electromagnetic signal activates the right hand sensor 44 the amplifier 48 outputs an instruction to the steering motor 52 to turn the steering wheel 55 to the right. The drive motor 72, thus, automatically turns the mobile platform 20 so as to travel toward emitter 27.

B. MECHANICAL STEERING CONTROL

Figure 7:
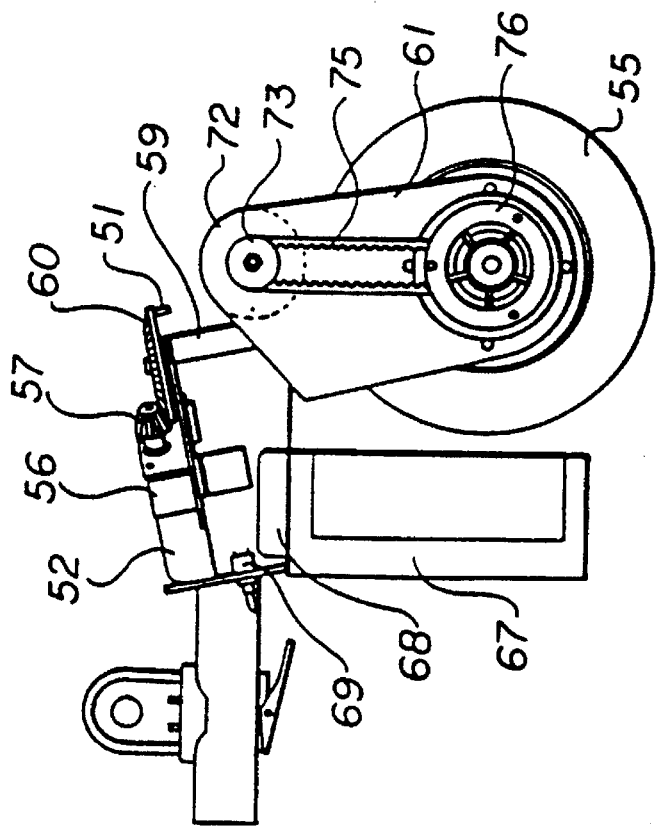
Figure 6:
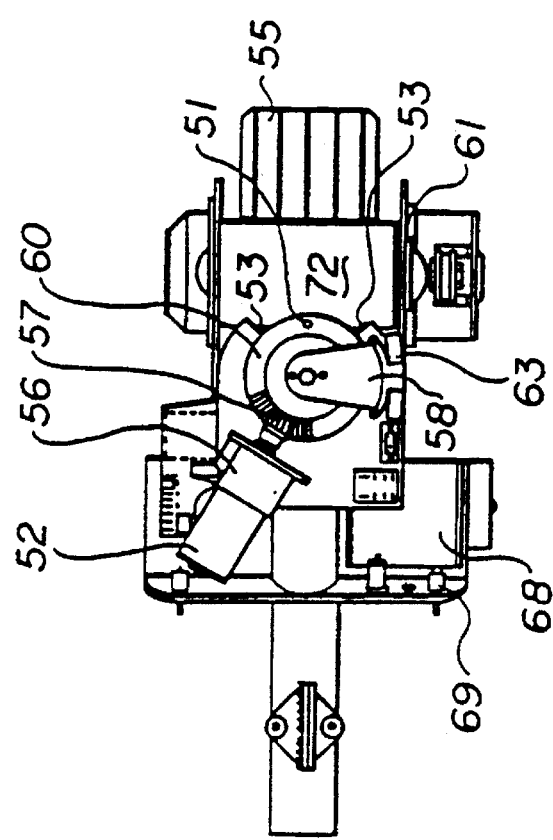
FIG. 6 is a top view of the automatic tracking mobile platform of FIG. 1a with the receiver housing removed.

When a receiver signals the steering motor 52 to turn the steering wheel 55 left or right, the steering gear 56 is engaged in the appropriate left or right direction. As shown in FIGS. 6 and 7, the steering gear 56 is connected to a small bevel gear 57, which turns a main bevel gear box 60 which is connected to a cam 58 that turns the steering wheel 55. The receiver platform 25 turns with the steering wheel 55 in order to receive tone-modulated electromagnetic signal and determine if the mobile platform 20 is going toward emitter 27.

Thus, turning the main bevel gear 60 turns the steering wheel 55, as illustrated in FIG. 6. Limit switches 53 are triggered by turning the main bevel gear 60 a certain distance either left or right. Therefore, the limit switches 53 simply serve to switch the steering motor 52 off when the steering wheel 55 turns as far as it is allowed to go by pin 51 for the limit switch. FIG. 6 shows how the limit switches 53, when tripped, connect to the steering motor 52 and set the motor 52 so that it stops turning. Return switch 63 allows for automatic centering of steering 55 to a straight ahead position.

Also shown in FIG. 7 is connection 8 mounted on main number 5 for pivotal attachment of upper arm 6. Box 67 holds battery 68 for motor 72. On/off switch 69 serves to connect battery 68 to the permanent magnet motor 72.

C. STOP-AND-GO CONTROL

The automatic tracking mobile platform 20 must follow the user at a convenient distance. This means the mobile platform 20 should follow the user preferably at a distance of from about 5–30 feet, and should stop about 3–4 feet behind the stopped user. For example, this movement enables the golfer to walk to the mobile platform 20, select a club and hit his ball without the mobile platform 20 interfering with user's swinging motion. For other uses, this feature works in the same manner. The emitter 27 and the center sensor are used in conjunction with the control circuit 65 to control this start/stop motion.

Figure 5:
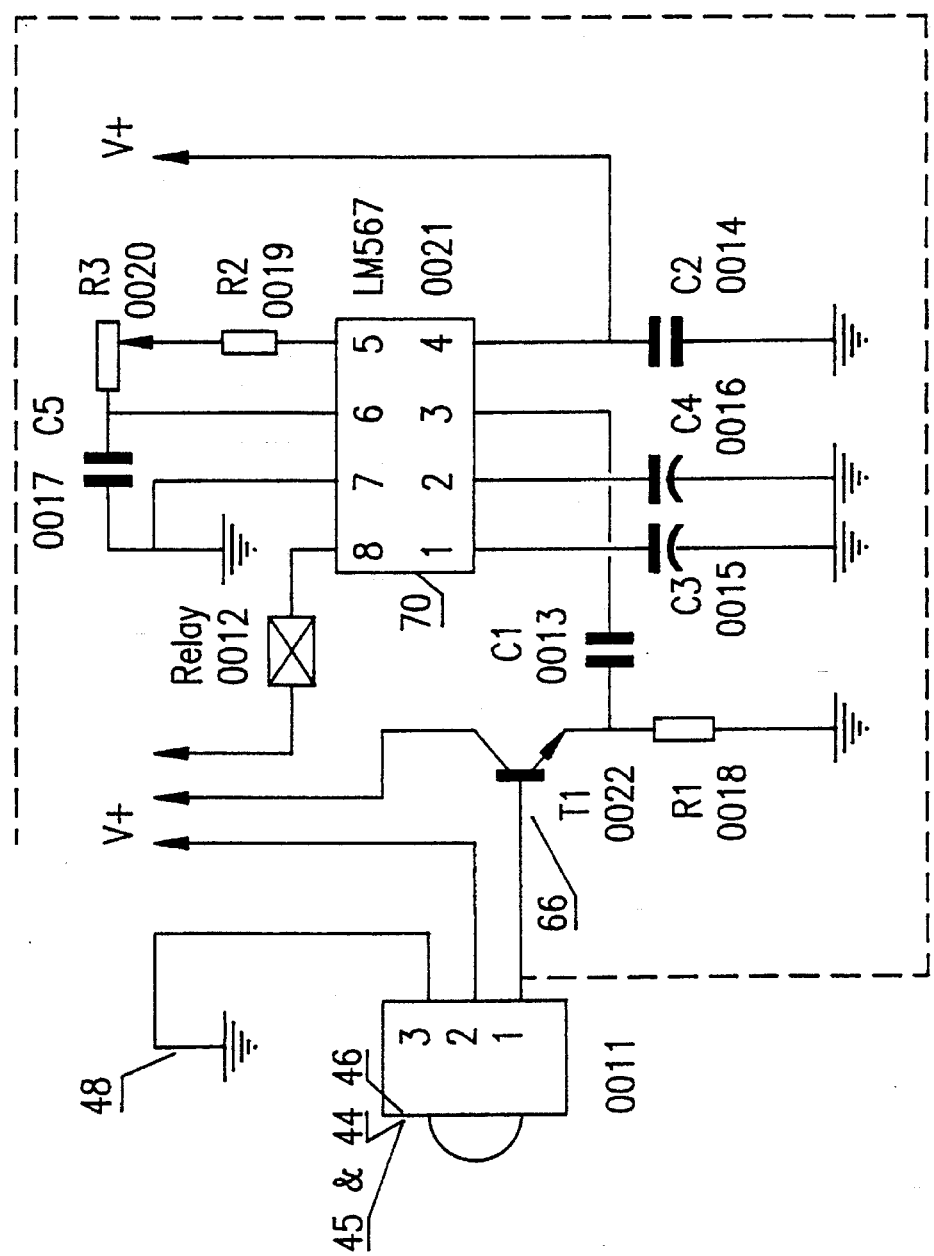

As shown in FIG. 5, the center electromagnetic sensor 45 is connected via a chip (LM567) tone decoder to control a circuit 65, designed to determine when the center senor 45 is approximately 3–4 feet away from the emitter 27. The control circuit 65 outputs a signal to the drive motor 72. When the center sensor 45 is less than approximately 3 feet from the emitter 27, the output signal will be so strong that it will not be recognized by the drive motor 72. In this manner, the intensity of the electromagnetic signal controls forward motion or stopping of the mobile platform 20.

D. MOTOR

The drive motor 72 is 12 volt, 120 watt, and, in the preferred embodiment, is a permanent magnet motor. The motor 72 operates the drive 73 as dictated by the controls described in the above section. When the motor 72 is activated, it directly turns a triangle belt pulley 75, which turns the main gear 76 that is located on the steering wheel 55, as shown in FIG. 6. The belt pulley 75, rotated by the drive motor 72, turns the gear 76 which causes the steering wheel 55 to rotate.

Figure 8C:
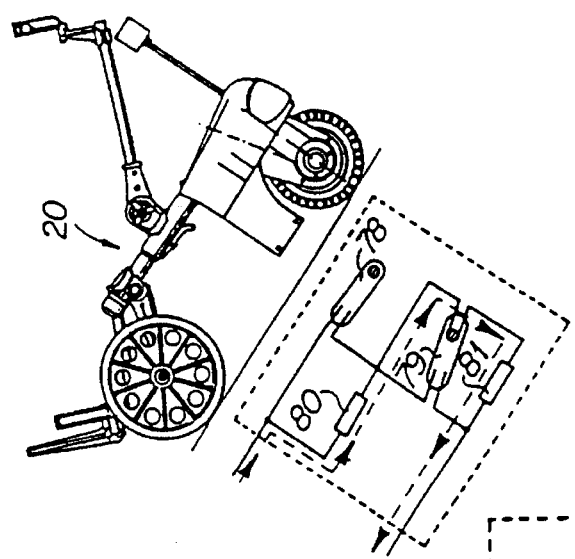
FIG. 8c is a side view of the automatic tracking mobile platform of FIG. 1a on a downhill incline with the motor power control circuit configured for a downhill incline.
Figure 8A:
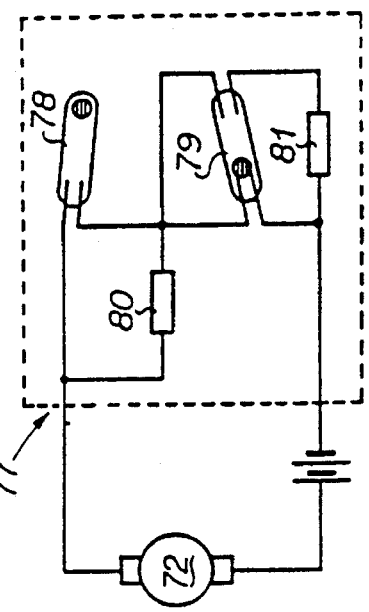
FIG. 8a is a side view of the automatic tracking mobile platform of FIG. 1a with the motor power control circuit configured for the mobile platform being on a level surface.
Figure 9:
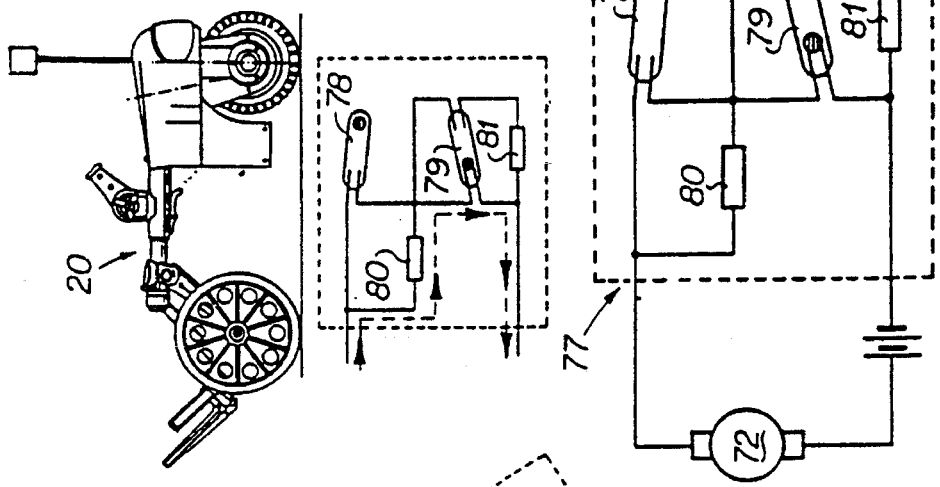
FIG. 9 is a circuit diagram of the power input control circuit for the drive motor of the automatic tracking mobile platform of FIG. 1a, and FIG. 10 is a top view of the automatic tracking mobile platform of FIG. 1a responding to different transmitter locations. When the transmitter moves to the left or right, the receiver senses this motion and causes the steering wheel of said automatic tracking mobile platform to turn in the direction of the transmitter's new location.

When activated the drive motor 72 directly turns the front wheel 55. To maintain constant mobile platform 20 speed, the motor 72 must output more power when the mobile platform 20 is going uphill than when the mobile platform 20 moves across level ground. As shown in FIG. 9, output power of the drive motor 72 is controlled by limiting power input to the drive motor 72 with mercury switches 78, 79 and power resistors 80, 81 in circuit 77. FIG. 8a shows the mobile platform on level ground, in which case mercury switch 78 is open and switch 79 is closed. In this arrangement, one-half power is sent to the drive motor 72 and one-half power is dissipated in power resistor 80.

Figure 8B:
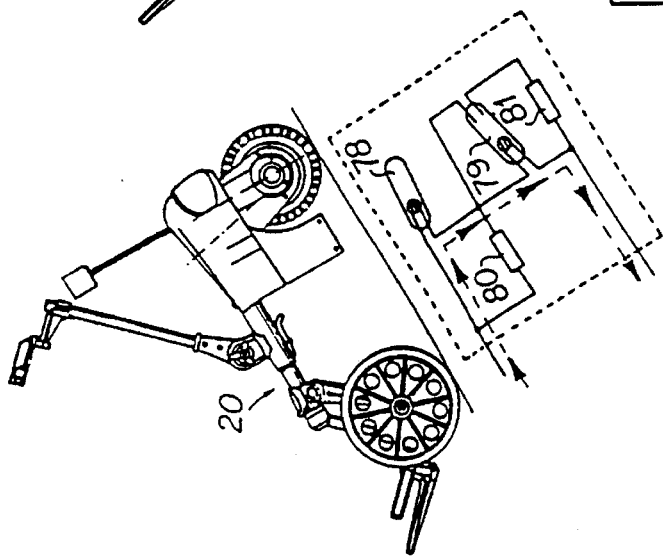
FIG. 8b is a side view of the automatic tracking mobile platform of FIG. 1a on an uphill incline with the motor power control circuit configured for an uphill incline.

When travelling uphill, FIG. 8b switches 78, 79 are closed causing the power input to bypass both resistors 80, 81. This configuration gives full power to the motor 72, thus increasing mobile platform 20 speed. When going downhill, FIG. 8c, switch 78 is open and switch 79 is open, too, which brings both power resistors 80 and 81 into the circuit and causes one-quarter power to be sent to the drive motor 72. Thus, the mobile platform 20 maintains a relatively constant speed through control of power input to the drive motor 72.

While the mobile platform is a new and useful item for the golfer, many other non-golf relates uses for the platform exist. For example, one might place luggage on the mobile platform and then the user could travel through an airport more easily. Or a bucket shaped container might be placed on the mobile platform and the assembly would be used as a wheelbarrow. Other uses obviously exist, and the claims are intended to cover these similar uses of the mobile platform.

While the invention has been disclosed in preferred forms by way of examples, it will be obvious to one skilled in the art that many modifications, additions and deletions may be made without departing from the spirit and scope of the invention as set forth in the following claims.

I claim:

1. A mobile platform which automatically tracks an electromagnetic signal emitter, said emitter being carried by a user, comprising;

a platform an emitter carried by said user, said emitter transmitting an electromagnetic signal;

at least two receivers located on said mobile platform to receive said signal from said emitter;

first circuitry connected to at least one of the receivers for determining, from said signal, what direction said platform must travel to follow said emitter;

a steering mechanism connected to the platform for automatically turning wheels of said platform to track said emitter in response to said first circuitry;

drive means for propelling the platform, said drive means including a drive motor, a drive element, and wheels; and second circuitry connected to at least one of the receivers to automatically control the starting and stopping of the drive means in response to the signal received by said receiver;

and further including means for remotely controlling said mobile platform wherein the user can override said automatic tracking, said means for remotely controlling said mobile platform being detached from said mobile platform, thereby allowing the user to override said automatic tracking from a distance.

2. The automatic tracking mobile platform claimed in claim 1 wherein:

said remote control means includes an emitter and a receiver of radio frequency signals.

3. The automatic tracking mobile platform claimed in claim 1 wherein:

the electromagnetic signal is of optical wavelength, of the class including infrared, visible, laser, and ultraviolet.

4. A mobile platform which automatically tracks an electromagnetic signal emitter, said emitter being carried by a user, comprising;

a platform an emitter carried by said user, said emitter transmitting an electromagnetic signal;

at least two receivers located on said mobile platform to receive said signal from said emitter;

first circuitry connected to at least one of the receivers for determining, from said signals, what direction said platform must travel to follow said emitter;

a steering mechanism connected to the platform for automatically turning wheels of said platform to track said emitter in response to said first circuitry;

drive means for propelling the platform, said drive means including a drive motor, a drive element, and wheels; and second circuitry connected to at least one of the receivers to automatically control the starting and stopping of the drive means in response to the signal received by said receiver; and third circuitry which controls a power input to said drive motor based on an angle of incline or decline of a surface on which said mobile platform is located, so that the mobile platform moves at a relatively constant speed whether traveling uphill, downhill, or on a flat surface, said third circuitry including mercury switches and power resistors so that the switches increase the amount of power dissipated in the resistors when the platform is traveling downhill, thereby decreasing the power sent to said drive motor, and wherein the power dissipated in the resistors is decreased when the platform is traveling uphill, thereby increasing the power sent to said drive motor.

5. The automatic tracking mobile platform claimed in claim 4 further includes:

means for remotely controlling said mobile platform wherein the user can override said automatic tracking, said means for remotely controlling said mobile platform being detached from said mobile platform, thereby allowing the user to override said automatic tracking from a distance.

6. The automatic tracking mobile platform claimed in claim 5 wherein:

said remote control means includes an emitter and a receiver of radio frequency signals.

7. The automatic tracking mobile platform claimed in claim 5 wherein:

the electromagnetic signal is of optical wavelength, of the class including infrared, visible, laser, and ultraviolet.

8. The automatic tracking mobile platform claimed in claim 4 wherein:

the electromagnetic signal is of optical wavelength, of the class including infrared, visible, laser, and ultraviolet.

* * * * *